Aug. 15, 1967  F. STASTNY ETAL  3,336,184
COMPOSITE EXPANDED PLASTICS
Filed Nov. 9, 1965
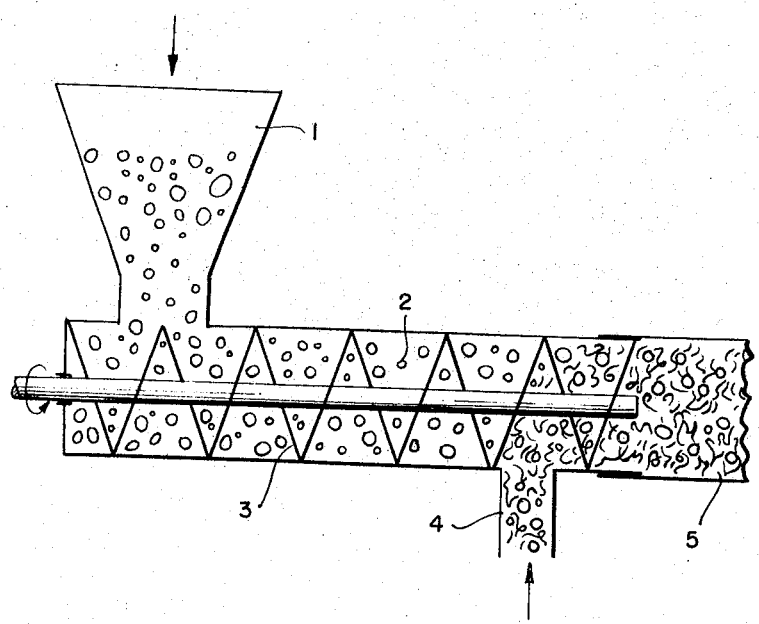
INVENTORS:
FRITZ STASTNY
LEO UNTERSTENHOEFER
FRITZ GRAF
HANS-JUERGEN LOEFFLER
BY
ATT'YS

United States Patent Office 3,336,184
Patented Aug. 15, 1967

3,336,184
COMPOSITE EXPANDED PLASTICS
Fritz Stastny, Ludwigshafen (Rhine), Leo Unterstenhoefer, Limburgerhof, Pfalz, Fritz Graf, Ludwigshafen (Rhine), and Hans-Juergen Loeffler, Berlin, Germany, assignors to Badische Anilin- & Soda-Fabrik Aktiengesellschaft, Ludwigshafen (Rhine), Germany
Filed Nov. 9, 1965, Ser. No. 514,737
Claims priority, application Germany, Jan. 26, 1962, B 65,667
8 Claims. (Cl. 161—168)

This application is a continuation-in-part of our copending application Ser. No. 252,330, filed Jan. 18, 1963.

This invention relates to new composite expanded plastics and to a process for their production.

It is known that porous shaped articles are obtained when partly expanded thermoplastic material (which has been formed by heating thermoplastic material containing an expanding agent) is further expanded and fused together in a mold which is not gastight when closed. In this way it is possible to prepare for example sheets or boards of porous plastics, for example of porous polystyrene, which have very low thermal conductivity and therefore have found wide application for insulation purposes. A certain shortcoming of such boards is the fact that although they have a low unit weight they are usually bulky so that transportation from the plate of manufacture to the place where they are to be used is uneconomical. On the other hand production direct on the building site is expensive on account of the attendant cost of equipment and has therefore not been adopted. Another disadvantage of the said boards is the fact that they must be assembled into the desired insulating layers by hand.

In addition to porous shaped articles of thermoplastics, cured resin foams have become known which are usually synthesized on the basis of phenol resins or urea resins. Such expanded materials are advantageously produced on site by bringing them to the desired location in a flowing form and then curing them. These foams are therefore easy to process, but they have certain disadvantages. For example, they have a tendency to shrink and crack. Moreover, they have only low mechanical strength, relatively high absorptivity for water and considerable permeability for water vapor, which is undesirable in many cases.

We have now found in accordance with this invention that valuable composite expanded plastics are obtained by introducing a curable resin foam which is still flowable into the interstices between particles of a porous plastic and allowing the foam to harden.

The composite expanded plastic obtained in this way is suitable for the production of shaped articles and particularly for insulation purposes, for example for the production of insulating layers in refrigerating chests or in structural components. It combines many of the advantages of the said porous thermoplastics and hardened resin foams. A particular advantage of the process of the present invention is that the composite expanded plastic can be produced on the building site with a minimum of expense for equipment and can be transported in a flowable condition to the place where it is to be used. It is therefore no longer necessary to prepare insulating layers from preformed shaped articles by hand. The composite expanded plastics can be subjected to much higher mechanical stresses than the said hardened resin foams. The compressive strength of the composite expanded plastics almost reaches that of porous thermoplastics. Shrinkage and cracking are not observed and absorption of water and permeability to water vapor of the composite expanded plastics are much less than those of hardened resin foams. It is possible to provide the surface of the composite expanded plastic with a firmly adherent coating having special mechanical and thermal resistance, for example of asbestos or asbestos mixtures.

Suitable plastics from which the porous particles may be made are for example polyvinyl chloride, polyethylene and polymethacrylates. It is particularly advantageous to use porous particles consisting of styrene polymers such as polystyrene or copolymers of styrene with other olefinically unsaturated polymerizable compounds, such as acrylonitrile or butadiene. They may be obtained in the conventional manner, i.e. by heating particles of plastic which contain an expanding agent to a temperature above the boiling point of the expanding agent and the softening point of the plastic under conditions under which the particles do not cohere. The expanded particles of plastic thus obtained which contain closed cells may advantageously be stored for some time in the air, for example for half an hour to some days, before they are further processed either in the moist or dry state. Particles having approximately spherical shape are preferred. It is advantageous for the bulk of the expanded particles of plastic to have a diameter of more than 2 mm. It is advantageous to start from porous plastics the particles of which have diameters between 2 and 10 mm.

Those hardenable resin foams are preferred which are obtained from urea-formaldehyde, phenol-formaldehyde or melamine-formaldehyde condensation products. These foams are prepared in the usual way, generally with the addition of a curing agent, for example an acid reacting compound in the case of aminoplast and phenoplast resins, and transported to the place at which they are to be mixed with the said porous plastic.

The way in which the porous particles of plastic and the curable flowable resin foam are mixed with each other is essential for the success of the process.

The most obvious method, namely introducing the porous plastic particles into the preformed curable foam with good mixing, surprisingly gives wholly unsatisfactory results. Possibly the differences in density of the expanded plastics to be composited prevents uniform dispersion of the porous plastic in the resin foam. The fact that the porous plastic is not wettable also counteracts uniform incorporation of the plastic in the foam. This is surprising because it is known that resin foams are prepared using a substance which lowers surface tension. Good wettability of the water-repellent porous plastic particles would therefore have been expected.

Good results are achieved on the contrary when, instead of introducing the porous plastic particles into the flowable resin foam, the reverse procedure is adopted and the resin foam is introduced into the interstices between the particles of porous plastic. It is advantageous for the particles of porous plastic to be in contact with each other and in the ideal case to be present in the densest possible packing. The porous plastic particles need not be immovably fixed but should be restricted in their movability so that they cannot escape from the foam penetrating into the interstices.

The process according to this invention may be carried out batchwise.

It is particularly advantageous to carry out the new process continuously in a mixing apparatus having a conveying and mixing chamber provided with a screw. A suitable apparatus is shown diagrammatically in the accompanying drawing by way of example. Porous plastic particles pass through a hopper 1 into a conveying and mixing chamber 2 and are moved by a screw 3 past an inlet 4 through which a curable flowable resin foam is introduced. The interstices between the porous plastic particles are filled up and the flowable composite expanded resin is then passed through a pipe 5 to the place where it is to be used. It is important so to correlate the dimensions of hopper 1, conveying and mixing chamber 2 and screw 3, and also the operating conditons that the mixing and conveying chamber 2 is filled as completely as possible with porous plastic particles. It is obvious that for example the cross-section of the narrowest part of the hopper 1 should be sufficiently large to permit the passage of an amount of plastic particles sufficient to fill the spaces between the screwthread of the screw 3. The speed of the screw should not be too high because in this case the porous plastic particles are not conveyed but revolve about the axis of the screw. It is clear that the most favorable speed is also dependent on the pitch of the screw. Another factor is the pressure under which the curable flowable resin foam is introduced through the inlet 4 into the mixing vessel. If this pressure is too high, the foam may escape through the hopper 1.

It is possible in a suitable mixing apparatus to produce a composite expanded plastic which has a high content, for example up to 60% or even up to 95% by volume, of porous plastic. It is also possible to prepare composite expanded plastic in which the proportion of porous plastic particles is considerably less, for example 30% or as little as 25% by volume. This can be achieved for example by supplying further curable flowable resin foam to the mixing and conveying chamber at a point nearer to the end than the inlet 4. Surprisingly it was found that the resin foam is not destroyed by being mechanically moved in the mixing chamber.

The composite flowable expanded plastic is advantageously conveyed through pipe 5 to the place where it is to solidify. This may be effected by maintaining a pressure difference between the mixing chamber and the place to which it is desired to convey the flowable composite expanded plastic. For example a sufficiently high pressure may be set up in the mixing chamber by providing a closure for the hopper 1 and introducing compressed air therethrough. It is obvious that the pressure under which the resin foam enters the inlet 4 must then be correspondingly higher. It is however also possible to place the final mixture under pressure, for example by introducing air through the shaft of the screw. It is also possible to effect good distribution of the flowable foam in situ in the conventional manner, for example by means of agitators or vibrators.

It is obviously also possible to convey the flowable composite expanded plastic to the place where it is to be used in other ways, for example in suitable vessels.

The invention is illustrated by the following examples in which parts and percentages are by weight unless otherwise stated.

*Example 1*

An apparatus as shown in the drawing contains a conveying and mixing screw. The screw has a length of 1020 mm. and a diameter of 100 mm. The pitch is 60 mm. 300 liters of spherical expanded polystyrene particles having the density of 16.5 g./l. and the average diameter 4 to 5 mm. are introduced into the apparatus every 3.3 minutes. The particles are conveyed in the direction of the pipe 5 by the rotation of the screw 3. The inlet 4 has an internal diameter of 12.5 mm. and a urea-formaldehyde foam which has not yet been cured is forced in through the same.

This foam is prepared in a conventional mixing apparatus from a 30% aqueous solution of a urea-formaldehyde precondensate (molar ratio of urea to formaldehyde equal to 1:1.8) and a solution of an expanding agent consisting of an aqueous solution of 19% of sodium diisopropylnaphthalene sulfonate and 10% of phosphoric acid, with the addition of air in the usual way. 1.7 liters of the solution of the expanding agent is used for each 2 liters of the urea-formaldehyde precondensate solution. The flowable urea-formaldehyde foam, not yet cured, obtained from 10.8 liters of this expandable mixture is forced into the apparatus through the inlet 4 during every 3.3 minutes. This foam fills the cavities between the expanded polystyrene particles and with the latter is discharged from the apparatus through the pipe 5 at the rate of 347 liters during every 3.3 minutes.

*Example 2*

The apparatus used is a mixing tube having two inlet openings and one outlet opening. A 60% aqueous solution of a urea-formaldehyde precondensate containing 0.1% of oxalic acid is introduced as a foam together with air at a pressure of 4 atmospheres gauge through one of the inlet openings. By the suction thus created, porous spherical particles of a copolymer of 90 wt. percent of styrene and 10 wt. percent of acrylonitrile having the apparent density of 12 kg./m.$^3$ are sucked in through the other inlet opening. There is then present in the mixing tube a mixture of about 50% by volume of urea-formaldehyde resin foam and 50% by volume of porous polystyrene particles.

The pressure which conveys the foam may be varied and thereby the ratio between foam and porous polystyrene particles may be adjusted in the desired way. A very intimate mixture of the components is formed in the mixing chamber; a rod or strand leaves the end of the tube and can be injected direct into cavities. This rod or strand consists of porous polystyrene particles which are embedded in expanded urea-formaldehyde resin. After about five to fifteen minutes, the foam hardens to a solid composition which completely fills the interstices between the polystyrene particles.

In this way, any desired cavity, for example casings for water piping, hollow spaces in cable ducts, or ventilation shafts, may be filled in a single operation with an insulating composite expanded plastic. The unit weight of the composite expanded material is between 12 and 18 kg./m.$^3$.

*Example 3*

A foam which has been prepared from a 50% solution of a melamine-formaldehyde precondensate is forced under a pressure of 6 atmospheres gauge through one of the inlet openings into the mixing tube described in Example 2. Comminuted particles of expanded polyvinyl chloride having a diameter of about 3 to 6 mm. are introduced through the other inlet opening. The mixing tube is kept at a temperature of 50° C. by means of steam in a jacket surrounding the mixing tube.

The mixing tube contains a flowable composite expanded plastic containing 30 to 70% by volume of one or other component depending on the pressure conditions. The mixture leaving the end of the mixing tube may be passed through a pipe into cavities of any shape, e.g. the spaces between inner and outer walls of refrigerators or refrigerating chests or cavities in prefabricated structural components.

After curing, the composite expanded plastic is distinguished by very high strength and toughness. It is eminently suitable for incorporation in structural components.

Porous particles of other plastics, such as polyethylene or polymethacrylates may be used instead of porous particles of polyvinyl chloride, and phenol-formaldehyde resin foam may be used instead of melamine-formaldehyde resin foam.

We claim:

1. A process for the production of a composite expanded plastic structure which comprises:
    introducing expanded spherical porous particles of a thermoplastic polymer into one end of an elongated conveying and mixing chamber for conveyance therethrough such that said particles initially substantially fill said chamber in intimate contact with each other;
    forcing into said chamber a curable, flowable, aqueous resin-contaning foam in which the resin is selected from the class consisting of urea-formaldehyde, phenol-formaldehyde and melamine-formaldehyde condensates so as to fill the interstices between said spherical particles during their conveyance through said chamber, thereby forming a flowable, curable composite plastic mixture;

discharging said curable composite plastic mixture from the other end of said mixing and conveying chamber and depositing the same in a mold cavity; and curing said composite mixture in said mold cavity to produce a solid expanded plastic structure.

2. The product obtained by the process of claim 1.

3. A process as claimed in claim 1 wherein said thermoplastic polymer is a styrene polymer.

4. A process as claimed in claim 1 wherein said thermoplastic polymer is polystyrene and said resin is a urea-formaldehyde condensate.

5. A process as claimed in claim 1 wherein said expanded particles of the thermoplastic polymer have a diameter of from 2 to 10 mm.

6. A process as claimed in claim 1 wherein said expanded particles constitute from 30 to 70% by volume of the composite plastic mixture.

7. A process as claimed in claim 1 wherein a styrene polymer as the particles of a thermoplastic polymer are introduced at one end of a substantially tubular chamber provided with a screw and are conveyed by said screw past in inlet through which said resin-containing foam is introduced, and the resulting composite plastic mixture is subsequently discharged from the other end of said chamber and deposited in a mold cavity.

8. A process as claimed in claim 7 wherein the thermoplastic polymer is polystyrene and said resin is a urea-formaldehyde condensate.

References Cited

UNITED STATES PATENTS

| | | | |
|---|---|---|---|
| 2,744,291 | 5/1956 | Stastny et al. | 264—53 |
| 2,892,216 | 6/1956 | Steel | 264—46 XR |
| 2,958,905 | 11/1960 | Newberg et al. | 264—51 |
| 3,050,427 | 8/1962 | Slayter et al. | 264—47 XR |
| 3,063,953 | 11/1962 | Eberl et al. | 264—50 XR |
| 3,245,829 | 4/1966 | Beaulien et al. | 260—2.5 XR |

FOREIGN PATENTS

| | | |
|---|---|---|
| 742,803 | 1/1956 | Great Britain. |
| 748,990 | 5/1956 | Great Britain. |
| 818,097 | 8/1959 | Great Britain. |
| 889,278 | 2/1962 | Great Britain. |

OTHER REFERENCES

Stastny, Fritz: "New Methods for the Fabrication of Styropor," pp. 15–17 (a BASF reprint from "Der Plastverarbeiter," 7,242–250 (1955).

ALEXANDER H. BRODMERKEL, *Primary Examiner.*

P. E. ANDERSON, *Assistant Examiner.*